(12) United States Patent
Kumar

(10) Patent No.: US 9,104,917 B2
(45) Date of Patent: Aug. 11, 2015

(54) METERING INFORMATION COLLECTION

(71) Applicant: Verizon Patent and Licensing Inc., Basking Ridge, NJ (US)

(72) Inventor: Anil Kumar, Chandler, AZ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 96 days.

(21) Appl. No.: 13/929,264

(22) Filed: Jun. 27, 2013

(65) Prior Publication Data

US 2015/0003665 A1 Jan. 1, 2015

(51) Int. Cl.
*G06K 9/00* (2006.01)
(52) U.S. Cl.
CPC .................................. *G06K 9/00771* (2013.01)
(58) Field of Classification Search
CPC ................................ G01D 4/004; G01D 4/002
See application file for complete search history.

(56) References Cited

U.S. PATENT DOCUMENTS

| | | | | |
|---|---|---|---|---|
| 5,559,894 | A * | 9/1996 | Lubliner et al. | 382/100 |
| 6,208,266 | B1 * | 3/2001 | Lyons et al. | 340/870.02 |
| 7,310,052 | B2 * | 12/2007 | Bowman | 340/870.02 |
| 8,055,590 | B2 * | 11/2011 | Cameron | 705/412 |
| 2005/0035877 | A1 * | 2/2005 | Kim | 340/870.02 |
| 2006/0045389 | A1 * | 3/2006 | Butterworth | 382/321 |

* cited by examiner

*Primary Examiner* — Nirav G Patel
*Assistant Examiner* — Ian Lemieux

(57) ABSTRACT

A computing device configured to gather utility metering information. In embodiments, the computing device may comprise a transceiver and an image processing module. The image processing module may be coupled to the transceiver and configured to receive an image utilizing the transceiver. The image may include one or more utility meters. The image processing module may be further configured to extract metering information from the one or more utility meters of the image and transmit this metering information to a utility provider associated with the utility meter Other embodiments may be described and/or claimed.

25 Claims, 6 Drawing Sheets

METERING INFORMATION COLLECTION

TECHNICAL FIELD

Embodiments of the present disclosure are related to the field of data processing, and in particular, to the field of utility data collection.

BACKGROUND

Readings of utility meters have traditionally been taken manually with a representative of the utility company physically travelling to the meter to gather metering information from the utility meter. These traditional utility meters have been slowly converting over to more modern meters capable of autonomously sending metering information to a utility company associated with the meter. Under the current state of the art, however, changing a traditional utility meter to one of these more modern meters involves removing the traditional meter and replacing it with another that is capable of sending the metering information. Replacing the traditional meter with a more modern meter may require a service interruption of the associated utility while the traditional meter is replaced with a more modern one.

DETAILED DESCRIPTION OF ILLUSTRATIVE EMBODIMENTS

A computer readable storage medium, computer-implemented method, computing devices, and system are discussed herein, among other embodiments. In embodiments, the computer-readable storage medium may have instructions stored thereon. The instructions, when executed by a computing device may configure the computing device to receive an image of one or more utility meters, process the image of the one or more utility meters to extract from the image at least metering information for respective ones of the one or more utility meters, and transmit at least the extracted metering information of the one or more utility meters to a utility service provider.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
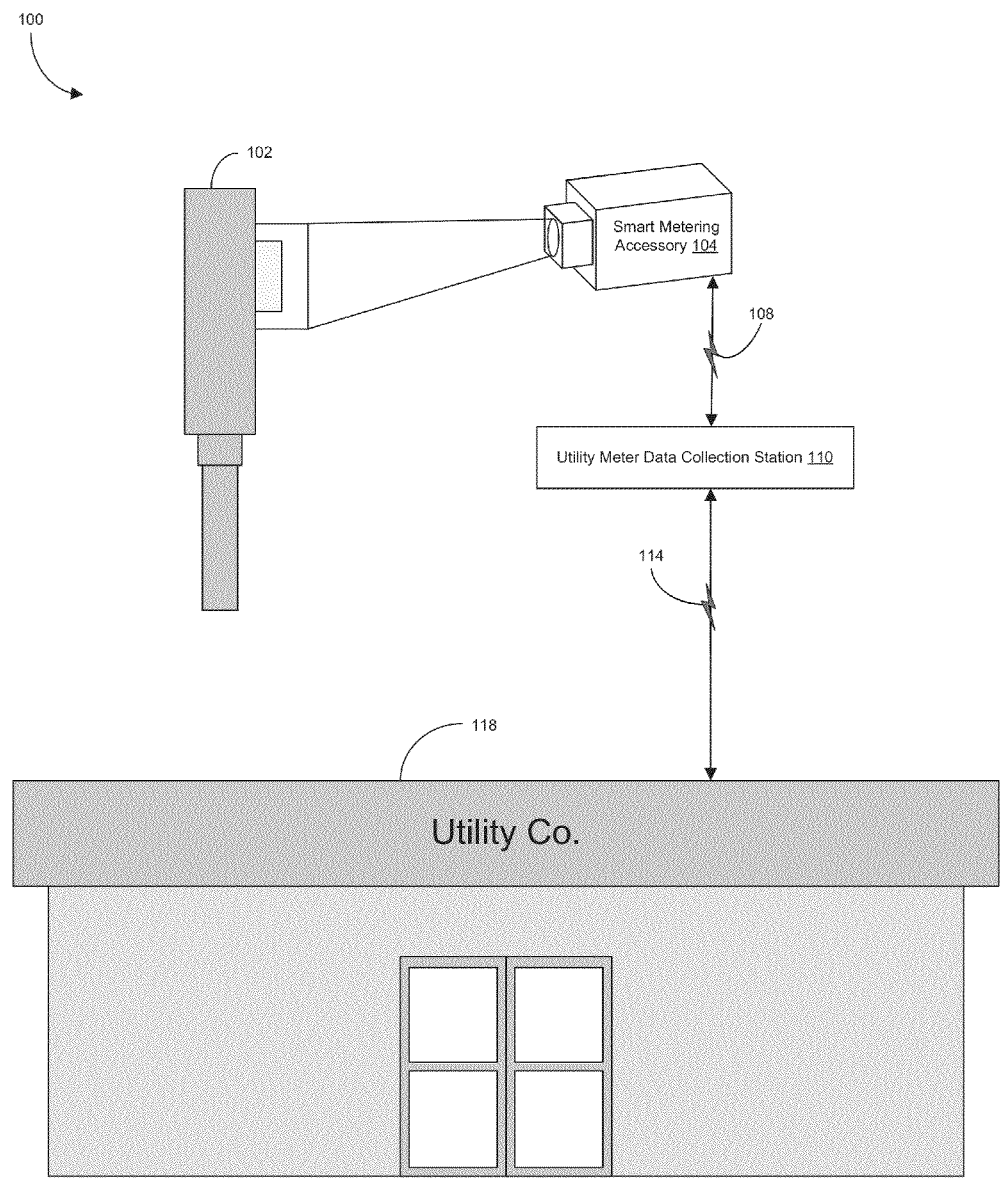
FIG. 1 depicts an illustrative system for metering information collection, according to some embodiments of the present disclosure.

FIG. 1 depicts an illustrative system 100 for metering information collection, according to some embodiments of the present disclosure. In embodiments, the system may be comprised of a smart metering accessory 104 and a gateway/utility meter data collection station 110, hereinafter referred to as utility meter data collection station 110. The smart metering accessory 104 may be configured to be coupled to utility meter data collection station 110 via data connection 108. While depicted herein as a wireless data connection, data connection 108 may be any type of wired or wireless data connection, or any combination thereof, without departing from the scope of this disclosure.

Smart metering accessory 104 may be configured to capture an image of utility meter 102, and transmit this image to utility meter data collection station 110 via data connection 108. In embodiments, smart metering accessory 104 may be configured to be programmable to capture the image at regularly occurring intervals. In other embodiments, utility meter data collection station 110 may be configured to be programmable to control smart metering accessory 104 to capture the image at regularly occurring intervals. For example, it may be desirable to capture an image based upon a billing cycle associated with the utility. It will be appreciated, however, that any interval is contemplated and this disclosure should not be so limited. In some embodiments, smart metering accessory 104 may be configured to receive a control signal, not depicted herein, which may cause the smart metering accessory 104 to capture an image and transmit that image to utility meter data collection station 110. This signal-directed image capture may be desirable, for example, when the utility is being changed from one person to another or when trying to determine if utility meter 102 has been, or is being, tampered with. In some embodiments, utility meter data collection station 110 may be configured to send the signal, while in other embodiments utility company 118 may send the signal directly.

Utility meter data collection station 110 may be configured to receive the image from the smart metering accessory 104. In some embodiments, utility meter data collection station 110 may be further configured to process the image, extract metering information from the image for one or more utility meters in the image, and forward the metering information of the one or more utility meters in the image to utility company 118 via data connection 114. While depicted herein as a wireless data connection, data connection 114 may be any type of wired or wireless data connection, over one or more private and/or public networks, or any combination thereof, without departing from the scope of this disclosure. In some embodiments, utility meter data collection station 110 may be configured to forward the image on to utility company 118 for further processing without performing processing itself.

Utility company 118 may utilize the metering information for any number of purposes, including, but not limited to, calculating a bill associated with utility meter 102, determining if the utility is currently functional, e.g., if the reading of utility meter 102 is changing, or determining whether utility meter 102 has been tampered with, e.g., detecting that a meter has been manually changed by comparing images captured at different points in time.

In some embodiments, smart metering accessory 104 and utility meter data collection station 110 may be combined into a single unit. In other embodiments, utility meter data collection station 110 may not be necessary and smart metering accessory 104 may be configured to forward the image directly to utility company 118.

It will be appreciated that smart metering accessory 104 may be any type of device capable of performing the associated processes described herein. This includes stationary and mobile computing devices. The mobile computing device may include, but are not limited to, a smart phone, tablet, ultrabook, ebook, laptop computer, etc. It will be further appreciated that the utility meter data collection station 110 may be any type of device capable of performing the associated processes described herein, including, but not limited to, those discussed above in reference to the smart metering accessory 104.

Figure 2:
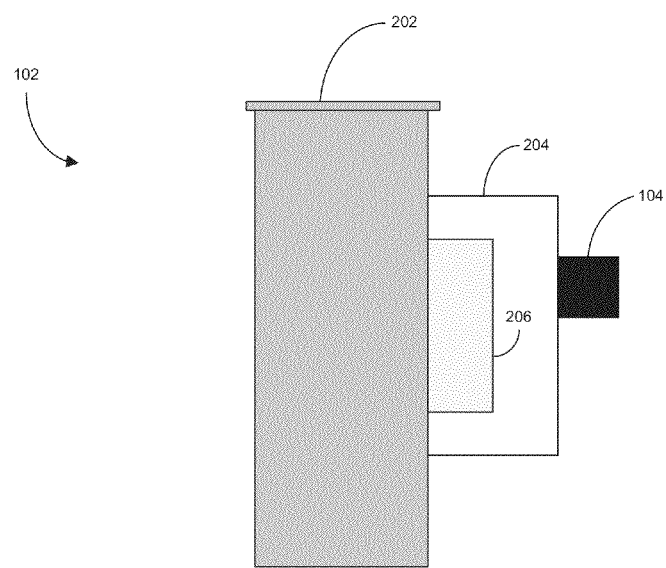
FIG. 2 is a diagram of an illustrative configuration of a utility meter with a smart metering accessory, according to some embodiments of the present disclosure.

FIG. 2 is a diagram of an illustrative configuration of utility meter 102 and a smart metering accessory 104, according to some embodiments of the present disclosure. In embodiments, utility meter 102 may include a utility meter housing 202, a utility meter cover 204, and a utility meter display 206. In some embodiments, smart metering accessory 104 may be configured to be attached to utility meter cover 204. The smart metering accessory 104 may be positioned to capture an image of utility meter display 206. Smart metering accessory 104 may be configured to be attached to utility meter cover 204 in any number of ways, including, but not limited to, adhesive and/or mechanical fasteners. In some embodiments, it may be desirable to have smart metering accessory 104 configured to be attached in a secure manner to reduce the risk of an individual tampering with smart metering accessory 104.

It may be appreciated that any manner of fastening smart metering accessory 104 to utility meter 102 is contemplated by this disclosure and that smart metering accessory 104 need not necessarily be directly attached to utility meter cover 204. For example, smart metering accessory 104 may be configured to be attached to the end of one or more arms, not depicted herein, where the end of the arms not attached to the smart metering accessory 104 may be attached to utility meter housing 202 or utility meter cover 204. In further embodiments, as discussed in FIG. 3 below, the smart metering accessory 104 may not be attached directly or indirectly to utility meter 102.

Figure 3:
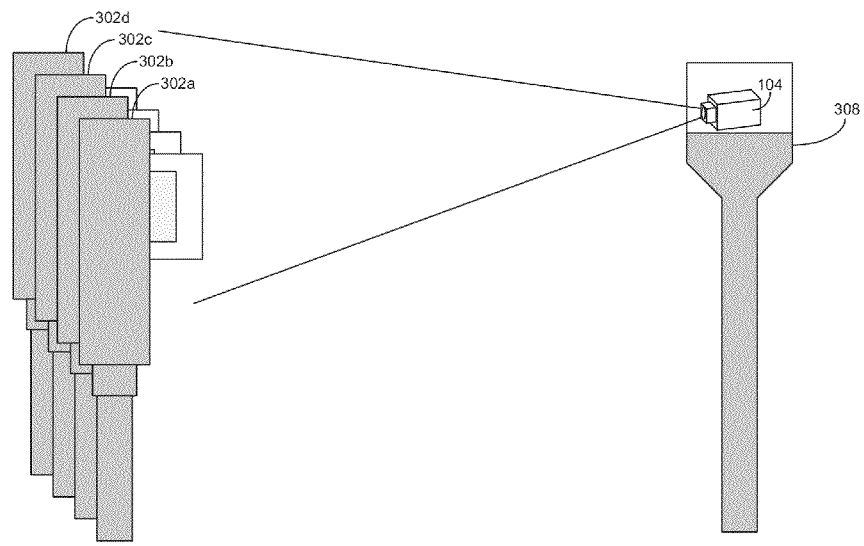
FIG. 3 is a diagram of one possible configuration of a smart metering accessory capable, according to some embodiments of the present disclosure.

FIG. 3 is a diagram of one possible configuration of smart metering accessory 104, according to some embodiments of the present disclosure. In embodiments, smart metering accessory 104 may be contained in a housing 308 positioned to enable smart metering accessory 104 to capture an image of multiple utility meters 302a-302d. In some embodiments, housing 308 may be securely constructed to prevent tampering with smart metering accessory 104. While depicted herein as a post-like structure, housing 308 may, in various embodiments, be any sort of structure designed to contain smart metering accessory 104. In some embodiments, not depicted herein, housing 308 may be adapted to be attached to an existing structure, such as, for example, a building adjacent to utility meters 302a-302d.

In some embodiments, utility meters 302a-302d may all be the same type of utility meter associated with the same utility service provider, while in other embodiments the utility meters 302a-302d may be different types associated with varying utility service providers. For example, utility meter 302a may be an electrical utility meter and the metering information from utility meter 302a may go to an associated electrical service provider, while utility meter 302b may be a natural gas utility meter and the metering information from utility meter 302b may go to an associated natural gas service provider. In such embodiments, utility meter data collection station 110 of FIG. 1 may be adapted to extract the different types of metering information and forward the metering information to the correct service provider. This is discussed further in reference to FIGS. 4 and 7, below.

Figure 4:
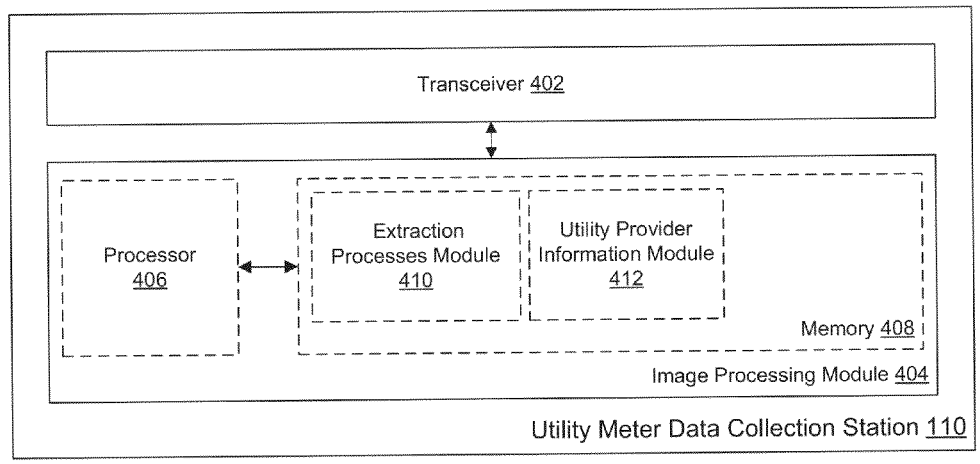
FIG. 4 is a diagram of one possible configuration of a utility meter data collection station, according to some embodiments of the present disclosure.

FIG. 4 is a diagram of one possible configuration of utility meter data collection station 110, according to some embodiments of the present disclosure. In embodiments, utility meter data collection station 110 may include transceiver 402 and image processing module 404. Transceiver 402 may be configured to receive images from smart metering accessory 104 and to forward metering information extracted from the images to one or more associated utility service providers.

In embodiments, image processing module 404 may be configured to extract the metering information from the image and determine one or more associated utility service providers. In some embodiments, image processing module 404 may include processor 406 and memory 408, coupled with processor 406. Memory 408 may contain instructions, which when executed by the processor may configure the image processing module to perform the extraction of the metering information from the image and the determination of the one or more associated utility service providers.

In some embodiments, memory 408 may contain an extraction processes module 410. The extraction processes module 410 may aid the image processing module 404 in extracting metering information where the utility meter data collection station 110 receives images of more than one type of utility meter. Image processing module 404 may be configured to extract preliminary information from the image of the utility meter and cross-reference that preliminary information with extraction processes module 410 to determine an extraction process for extracting the metering information from the image of the utility meter. This preliminary information may include, but is not limited to, a shape of the utility meter, a symbol, barcode, or alphanumeric code displayed on the utility meter, a layout of the utility meter, a location of the utility meter in the image, and/or a unique identifier of the smart metering accessory from which the image was received. In instances where more than one utility meter is contained in the image, the image processing module 404 may be configured to partition the image into individual utility meter images and process each image individually. In other embodiments, extraction processes module 410 may be comprised entirely of hardware or any combination of hardware and/or software.

In some embodiments, memory 408 may contain utility provider information module 412. Utility provider module 412 may enable image processing module 404 to determine a delivery method and/or format associated with the image of the utility meter. This may be accomplished utilizing the same preliminary information as that discussed above in reference to the extraction processes module 410. For example, the preliminary information, when cross-referenced with the utility provider information module 412, may indicate an email address to use in sending the metering information extracted from the image, and may indicate that the metering information should be converted into a specific delivery format, such as an extensible markup language (XML) schema or any other data format indicator. In other embodiments, utility provider information module 412 may be comprised of hardware and/or software.

In some embodiments, the preliminary information extracted from the utility meter image may also contain a unique identifier associated with the meter. This may be beneficial when the utility meter data collection station receives multiple separate utility meter images or a single image containing multiple utility meters. For example, apartment complexes often have banks of utility meters and this unique identifier may be utilized by the utility company to ensure the proper utility account reflects the metering information collected. The correct account may also be determined utilizing a unique identifier associated with smart metering accessory. In instances where more than one utility meter is contained in an image the unique identifier of the smart metering accessory may be combined with a location of the utility meter in the image to uniquely identify the utility meter.

In some embodiments, utility meter data collection station 110 may be configured to receive updates to its configuration from one or more of the utility service providers. These updates may be received, for example, via transceiver 402. In these embodiments, security protocols may be utilized to prevent one utility provider from updating a portion of the configuration that relates to other utility providers. For instance, each utility provider may have a specific account with which to login to utility meter data collection station 110 to make changes to configuration information associated with that utility service provider's account, such as the delivery method and/or format, for example.

In some embodiments, utility meter data collection station 110 may be a set top box or other such device. A set top box, in various embodiments, may be a computing device capable of receiving content from a content distributor, and providing the content for consumption by a user, using a content consumption device, such as a television or a computing tablet, coupled to the set top box. This content may, in some embodiments, be provided via a cable connection and/or internet connection established between the set top box and the content distibutor. In some embodiments, utility meter data collection station 110, may be associated with, or owned by, the utility provider associated with the one or more utility meters of the captured image.

Figure 5:
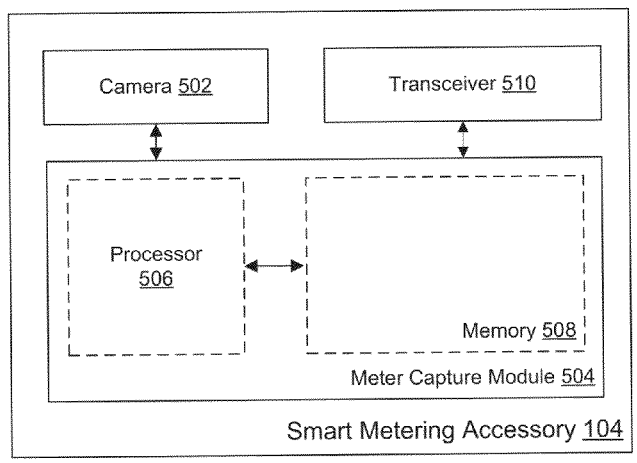
FIG. 5 is a diagram of one possible configuration of a smart metering accessory, according to some embodiments of the present disclosure.

FIG. 5 is a diagram of one possible configuration of a smart metering accessory 104, according to some embodiments of the present disclosure. In embodiments, smart metering accessory 104 may include camera 502 and transceiver 510, both of which may be coupled with meter capture module 504. Transceiver 510 may be configured to establish a data connection between smart metering accessory 104 and a receiver, such as, for example, utility meter data collection station 110 described above. This data connection may be any wired or wireless data connection.

Meter capture module 504 may be configured to utilize camera 502 to capture an image of one or more utility meters and may be further configured to transmit, utilizing transceiver 510, the captured image to a receiver, such as utility meter data collection station 110, for example. In some embodiments, meter capture module 504 may be configured to capture an image of the one or more utility meters at predetermined intervals. In some embodiments, meter capture module 504 may be configured to capture an image of the one or more utility meters upon receiving a signal indicating that an image capture is desired.

In embodiments, meter capture module may include processor 506 coupled with memory 508. Memory 508 may contain instructions which, when executed by processor 506, cause meter capture module 504 to perform any of the functions described herein.

Figure 6:
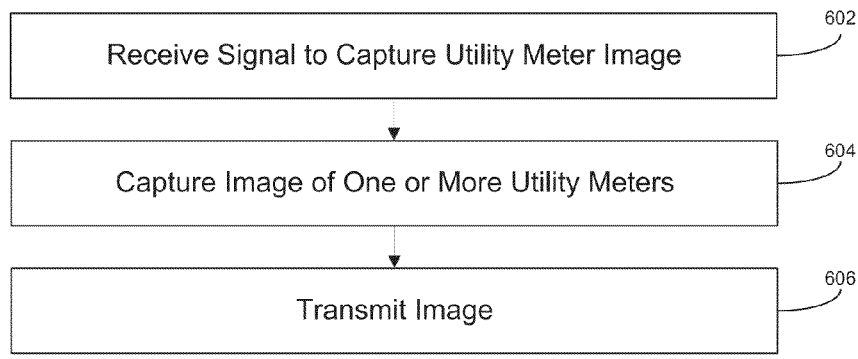
FIG. 6 is a flowchart of an illustrative process associated with a smart metering accessory, according to some embodiments of the present disclosure.

FIG. 6 is a flowchart of an illustrative process associated with a smart metering accessory, according to some embodiments of the present disclosure. The process may begin at block 602 where the smart metering accessory 104 may receive a signal to capture an image of one or more utility meters. This signal may be received from a utility meter data collection station, such as, for example, utility meter data collection station 110 discussed above, or may be received directly from a utility service provider. This signal may cause the smart metering accessory 104 to capture an image of one or more utility meters in block 604. The captured image may then be transmitted at block 606 to a receiver for further processing. The receiver of the image may, in some embodiments be a utility meter data collection station, such as utility meter data collection station 110, for example. In other embodiments, the receiver may be an associated utility service provider.

Figure 7:
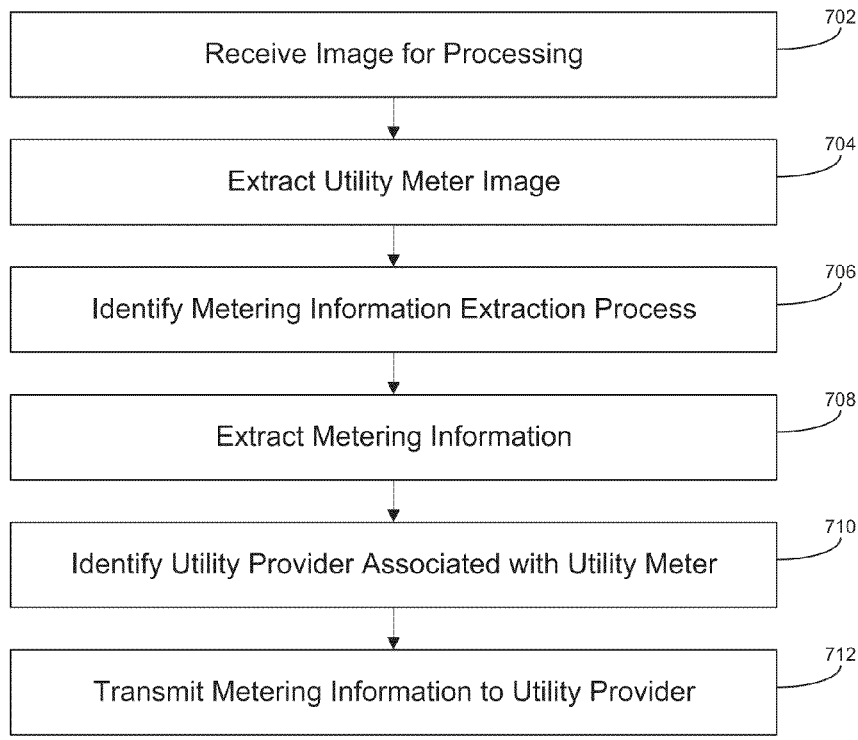
FIG. 7 is a flowchart of an illustrative process associated with a utility meter data collection station, according to some embodiments of the present disclosure.

FIG. 7 is a flowchart of an illustrative process associated with a utility meter data collection station, such as utility meter data collection station 110, for example, according to some embodiments of the present disclosure. The process may begin in block 702 where the utility meter data collection station may receive an image of one or more utility meters. In block 704 the utility meter data collection station may extract one or more utility meter images from the received image. This may be done, in various embodiments, by extracting pixels within and around an area that matches certain pre-defined patterns associated with one or more utility meters. Where there are multiple utility meters in the same image the extraction process may partition the images of the individual meters and place the images in a queue for processing of the individual utility meters. Where multiple utility meters are contained in the image, each of blocks 706-712 may be repeated for the individual utility meters.

In block 706 a metering information extraction process may be identified. The extraction process may be identified in any number of ways; for example, in some embodiments, the utility meter may display a unique alphanumeric code, symbol, or barcode which the utility meter data collection station may use in identifying the information extraction process. In other embodiments, the extraction process may be identified from a shape or layout of the meter that can be identified by comparing the image of the meter with pre-defined images in a database or other storage medium.

In block 708, the metering information may be extracted from the image of the utility meter. This may be done by utilizing the information extraction process identified in block 706. The extraction process may identify a layout of the metering information of the utility meter to enable the metering information to be extracted from the image. For instance, some meters may contain multiple dial-like readouts where each read-out corresponds with a differing quantity of the utility (e.g., one dial for single unit measurement, one dial for tens unit measurements, and a third dial for hundreds units measurements). The extraction process may help to ensure that each of these is extracted correctly. In some embodiments, extraction of the metering information may include processing the image through an optical character recognition (OCR) process to enable the metering information to be extracted from the image. Any manner of extracting the metering information is contemplated by this disclosure.

In block 710, a utility provider associated with the meter may be identified. In some embodiments; the utility meter may display a unique alphanumeric code, symbol, or barcode which the utility meter data collection station may use in identifying the utility provider. In other embodiments, the utility provider may be identified from a shape or layout of the meter that can be identified by comparing the image of the meter with predefined images in a database. Once the utility provider has been identified, delivery and format requirements associated with the utility provider may be identified in order to transmit the metering information to the utility provider in the correct format. In block 712 the metering information may be transmitted to the identified utility provider.

It may be appreciated, that, in some embodiments, the utility meter data collection station may only receive images of a single kind of utility meter and/or for a single utility provider. In these embodiments block 706 and/or 710 may be omitted from the process flow.

Figure 8:
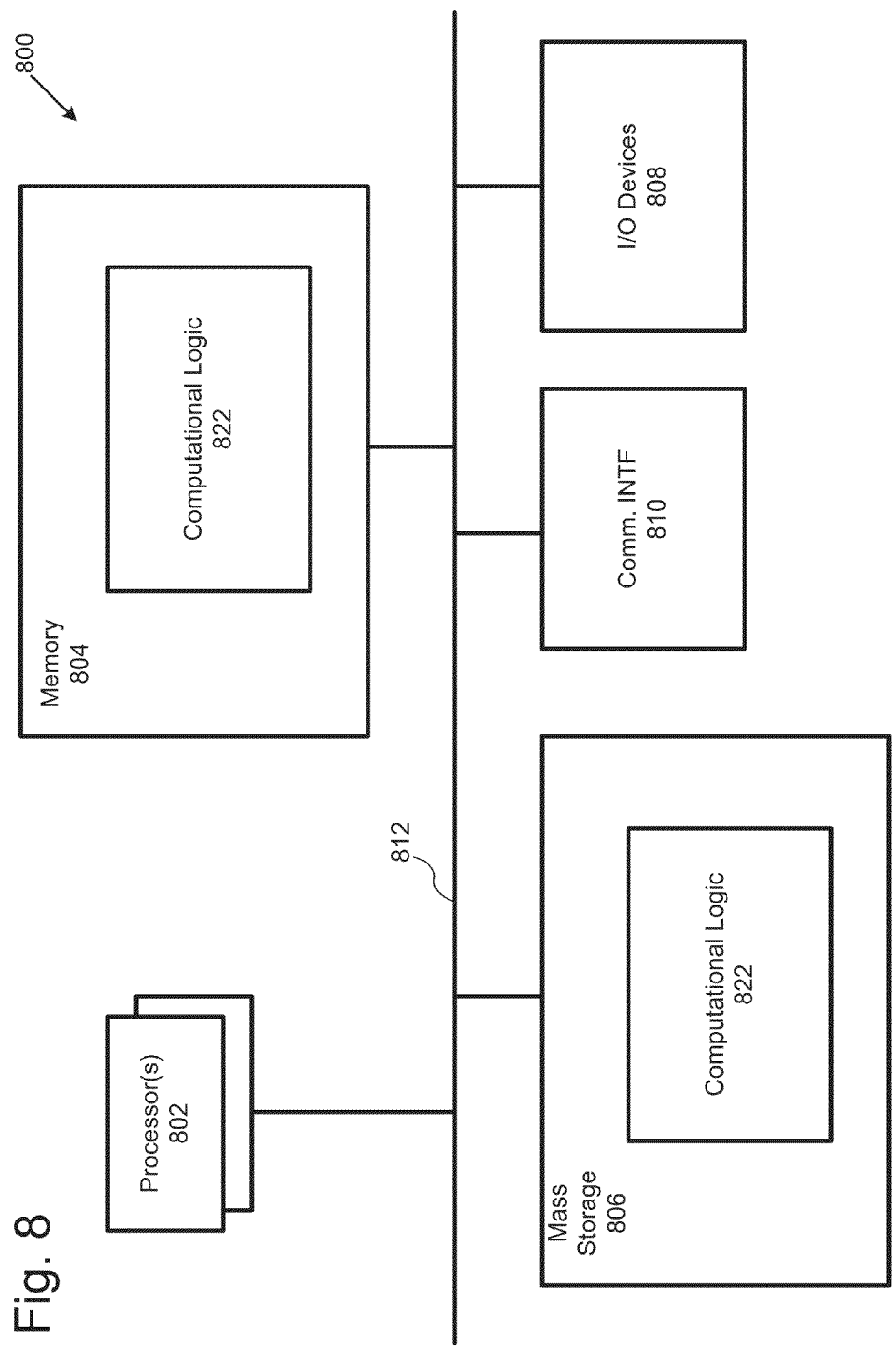
FIG. 8 illustrates an example computing environment suitable for practicing the disclosure, in accordance with various embodiments.

Referring now to FIG. 8, an example computer suitable for implementing various embodiments, is illustrated. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device 806 may be employed to store a working copy and a permanent copy of the programming instructions implementing the operations associated with carrying out the processes described above in reference to FIGS. 6 and 7. The various elements may be implemented by assembler instructions supported by processor(s) 802 or high-level languages, such as, for example, C, that can be compiled into such instructions.

The permanent copy of the programming instructions may be placed into permanent storage devices 806 in the factory, or in the field, through, for example, a distribution medium (not shown), such as a compact disc (CD), or through communication interface 810 (from a distribution server (not shown). That is, one or more distribution media having an implementation of the instructions for carrying out the process of FIGS. 6 and 7 may be employed to distribute the instructions and program various computing devices.

The number, capability and/or capacity of these elements 810-812 may vary, depending on upon the requirements. Their constitutions are otherwise known, and accordingly will not be further described.

Figure 9:
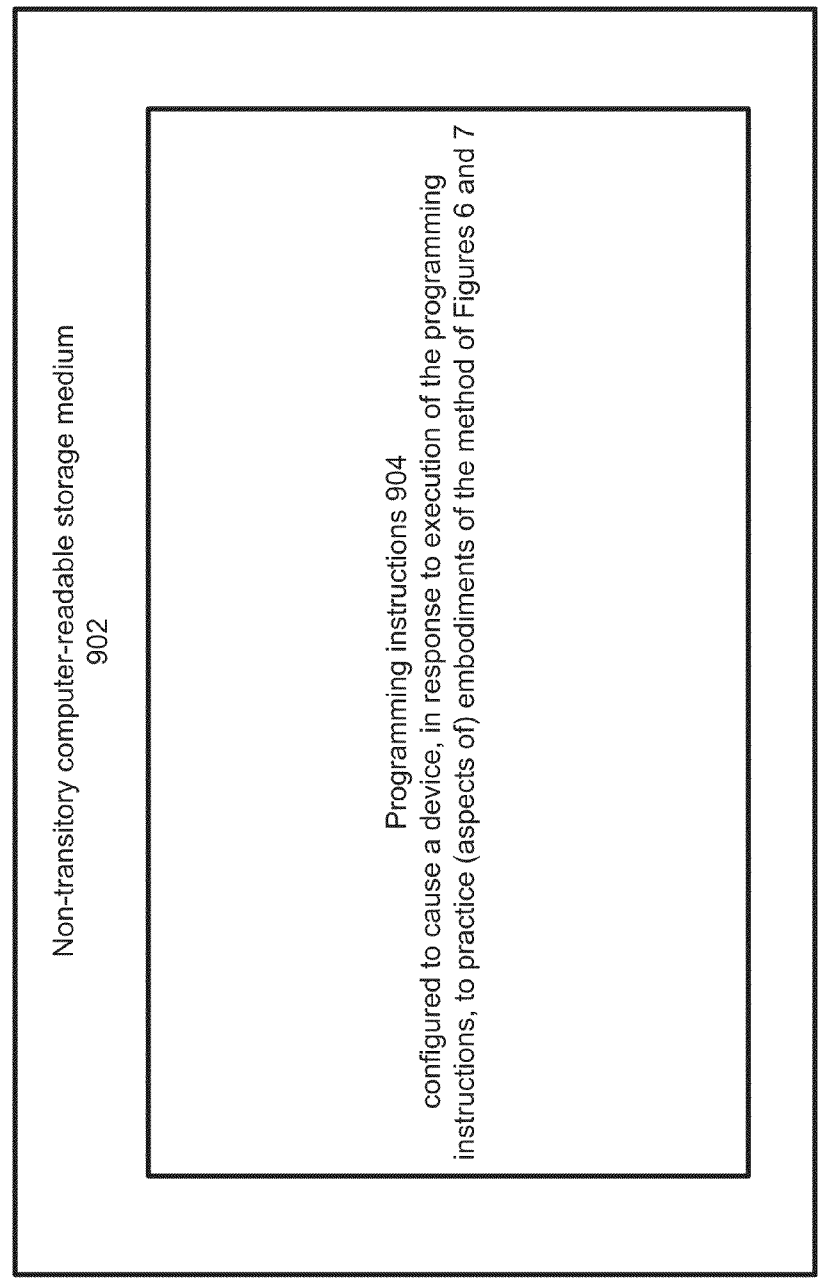
FIG. 9 illustrates an example storage medium with instructions configured to enable an apparatus to practice the present disclosure, in accordance with various embodiments.

FIG. 9 illustrates an example non-transitory computer-readable storage medium having instructions configured to practice all or selected ones of the operations depicted in FIG. 6 or 7, earlier described; in accordance with various embodiments. As illustrated, non-transitory computer-readable storage medium 902 may include a number of programming instructions 904. Programming instructions 904 may be configured to enable a device, e.g., computer 800, in response to execution of the programming instructions, to perform, e.g., various operations of the processes depicted in FIGS. 6 and 7. In alternate embodiments, programming instructions 904 may be disposed on multiple non-transitory computer-readable storage media 902 instead.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

EXAMPLES

Example 1 is one or more computer-readable storage media having instructions stored thereon configured to cause a computing device, in response to execution of the instructions by the computing device, to: receive an image of one or more utility meters; process the image of the one or more utility meters to extract from the image at least metering information for respective ones of the one or more utility meters; and transmit at least the extracted metering information of the one or more utility meters to a utility service provider.

Example 2 may include the subject matter of Example 1, wherein receive an image comprises receive an image from an image capture device via a wireless data connection coupling the computing device and the image capture device.

Example 3 may include the subject matter of Example 2, wherein the wireless data connection comprises a secure data connection.

Example 4 may include the subject matter of any one of Examples 1-3, wherein process the image comprises performance of an optical character recognition (OCR) process on the image.

Example 5 may include the subject matter of any one of Examples 1-3, wherein the instructions to process the image further cause the computing device to select a metering information extraction process for a first of the one or more utility meters of the image and to perform the selected metering information extraction process on the image to extract at least the metering information from the image for the first utility meter.

Example 6 may include the subject matter of Example 5, wherein the instructions to process the image further cause the computing device to determine a type associated with the first of the one or more utility meters and the selection of the metering information extraction process is based, at least in part, on the type.

Example 7 may include the subject matter of Example 6, wherein the type associated with the first of the one or more utility meters is based, at least in part, on a shape of the first of the one or more utility meters.

Example 8 may include the subject matter of any one of Examples 1-3, wherein the computing device is a mobile computing device.

Example 9 is a computer-implemented method to facilitate collection of data from utility meters comprising: receiving, by a computing device, an image of one or more utility meters; processing, by the computing device, the image of the one or more utility meters to extract from the image at least metering information for respective ones of the one or more utility meters; and transmitting, by the computing device at least the extracted metering information to a utility service provider.

Example 10 may include the subject matter of Example 9, wherein receiving an image further comprises receiving an image from an image capture device via a wireless data connection coupling the computing device and the image capture device.

Example 11 may include the subject matter of Example 10, wherein the wireless data connection comprises a secure data connection.

Example 12 may include the subject matter of any one of Examples 9-11, wherein processing the image comprises performing an optical character recognition (OCR) process on the image.

Example 13, may include the subject matter of any one of Examples 9-11, wherein processing the image further comprises selecting a metering information extraction process for a first of the one or more utility meters of the image and performing the selected metering information extraction process on the image to extract at least the metering information from the image for the first utility meter.

Example 14, may include the subject matter of Example 13, wherein processing the image further comprises determining a type associated with the first of the one or more utility meters and the selection of the metering information extraction process is based, at least in part, on the type.

Example 15, may include the subject matter of Example 14, wherein the type associated with the first of the one or more utility meters is based, at least in part, on a shape of the first of the one or more utility meters extracted from the image.

Example 16 may include the subject matter of any one of Examples 9-11, wherein the computing device is a mobile computing device.

Example 17, is a computing device that facilitates collection of data from utility meters comprising: a transceiver configured to transmit and receive data over a data connection with a utility meter accessory configured to be associated with one or more utility meters; one or more computing processors coupled to the transceiver; and an image processing module configured to be operated by the computing processors to: receive, from the utility meter accessory, an image of the one or more utility meters; process the image of the one or more utility meters to extract from the image at least metering information for respective ones of the one or more utility meters; and transmit at least the extracted metering information to a utility service provider.

Example 18 may include the subject matter of Example 17, wherein the data connection comprises a wireless data connection coupling the computing device and the metering accessory.

Example 19 may include the subject matter of Example 18, wherein the wireless data connection comprises an encrypted data connection.

Example 20 may include the subject matter of any one of Examples 17-19, wherein process the image of the one or more utility meters comprises performance of an optical character recognition (OCR) process on the image.

Example 21 may include the subject matter of any one of Examples 17-19, wherein the image processing module is further configured to select a metering information extraction process for a first of the one or more utility meters of the image; and to perform the selected metering information extraction process on the image to extract the metering information from the image for the first utility meter.

Example 22 may include the subject matter of Example 21, wherein the image processing module is further configured to determine a type associated with the first of the one or more utility meters and the selection of the metering information extraction process is based, at least in part, on the type.

Example 23 may include the subject matter of Example 22, wherein the type associated with the first of the one or more utility meters is based, at least in part, on a shape of the first of the one or more utility meters.

Example 24 may include the subject matter of Examples 17-19, wherein the computing device is a mobile computing device.

Example 25 is a system to facilitate collection of data from utility meters comprising: a metering accessory; and a utility meter data collection station; wherein the metering accessory is configured to be associated with one or more utility meters, capture an image of the one or more utility meters, and send the image to the utility meter data collection station; and wherein the utility meter data collection station is configured to receive and process the image of the one or more utility meters to extract from the image at least metering information for respective ones of the one or more utility meters, and send at least the extracted metering information to an utility service provider.

Example 26 may include the subject matter of Example 25, wherein the metering accessory comprises a housing configured to attach the metering accessory to at least one of the one or more utility meters.

Example 27 may include the subject matter of Example 26, wherein the housing is tamper resistant.

Example 28 may include the subject matter of Example 27, wherein the metering accessory is configured to capture and send the image at predetermined time intervals.

Example 29 may include the subject matter of any one of Examples 25-28, wherein the utility meter data collection station is configured to control the metering accessory to perform the capture and send at predetermined time intervals.

Example 30 may include the subject matter of Example 25, wherein the metering accessory further comprises a wireless communication interface configured to wirelessly receive a control signal from the utility meter data collection station to command the metering accessory to capture and send the image.

Example 31 may include the subject matter of Example 25, wherein the metering accessory comprises a wireless communication interface configured to wirelessly send the image to the utility meter data collection station over a wireless data connection.

Example 32 may include the subject matter of Example 31, wherein the wireless data connection comprises a secure wireless data connection.

Example 33 may include the subject matter of any one of Examples 25-28, wherein either or both of the metering accessory or the utility meter data collection station are mobile devices.

Example 34 is a computing device that facilitates collection of data from utility meters comprising: means for receiving an image of one or more utility meters; means for processing the image of the one or more utility meters to extract at least metering information from the image for respective ones of the one or more utility meters; and means for transmitting at least the extracted metering information to a utility service provider.

Example 35 may include the subject matter of Example 34, wherein receiving an image further comprises receiving an image from an image capture device via a wireless data connection coupling the computing device and the image capture device.

Example 36 may include the subject matter of Example 35, wherein the wireless data connection comprises a secure data connection.

Example 37 may include the subject matter of any one of Examples 34-36, wherein processing the image further comprises performing an optical character recognition (OCR) process on the image.

Example 38 may include the subject matter of any one of Examples 34-36, wherein processing the image further comprises selecting a metering information extraction process for a first of the one or more utility meters of the image and performing the selected metering information extraction process on the image to extract at least the metering information from the image for the first utility meter.

Example 39 may include the subject matter of any one of Examples 34-36, wherein the computing device is a mobile device Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A device comprising:
   a transceiver configured to exchange data over a data connection with a utility meter accessory associated with utility meters for a plurality of utility service providers; and
   one or more computing processors coupled to the transceiver, wherein the one or more computing processors are configured to:
   receive, from the utility meter accessory, an image of the utility meters;
   process the image of the utility meters to extract, from the image, metering information for the utility meters, wherein the one or more computing processors, when processing the image of the utility meters, are further configured to:
   partition the image to identify respective portions of the image associated with the utility meters, wherein the respective portions of the image include a first portion associated with a first of the utility meters and a second portion associated with a second of the utility meters,
   process the first portion and the second portion to determine a first attribute associated with the first utility meter and a second attribute associated with the second utility meter,
   determine, based on the first attribute, a first meter type of a plurality of meter types associated with the first utility meter and a first utility service provider of the plurality of utility service providers associated with the first meter,
   determine, based on the second attribute, a second meter type of the plurality of meter types associated with the second utility meter and a second utility service provider of the plurality of utility service providers associated with the second meter, wherein the first utility service provider and the second utility service provider are different,
   select, from a plurality of metering information extraction processes and based on the first meter type and a second meter type, a first information extraction process for the first utility meter and a second information extraction process for the second utility meter,
   perform the first metering information extraction process on the first portion to extract first metering information for the first utility meter, and
   perform the second metering information extraction process on the second portion to extract second metering information for the second utility meter; and
   transmit the first metering information and the second metering information to two or more of the plurality of utility service providers, wherein the one or more computing processors, when transmitting the first metering information and the second metering information, is further configured to:
   transmit the first metering information to the first utility service provider, and
   transmit the second metering information to the second utility service provider.

2. The device of claim 1, wherein the data connection comprises a wireless data connection coupling the device and the utility meter accessory.

3. The device of claim 1, wherein the one or more computing processors, when processing the image of the utility meters, are further configured to:
   perform an optical character recognition (OCR) process on the image.

4. The device of claim 1, wherein the first attribute includes one or more of:
   a shape of the first utility meter,
   a symbol displayed on the first utility meter, a barcode displayed on the first utility meter,
an alphanumeric code displayed on the first utility meter,
a layout of the first utility meter,
a position of the first utility meter in the image, or
an identifier associated with the utility meter accessory.

5. The device of claim 1, wherein the device is included in a set top box.

6. The device of claim 1, wherein the data connection comprises an encrypted data connection.

7. The device of claim 1, wherein the one or more computing processors are further configured to:
forward, via the data connection, a signal to the utility meter accessory, wherein the utility meter accessory acquires the image based on receiving the signal.

8. The device of claim 1, wherein the one or more computing processors are further configured to:
determine a first delivery format associated with the first utility service provider and a second delivery format associated with the second utility service provider, wherein the first delivery format includes a first extensible markup language (XML) schema and the second delivery format includes a second XML schema,
generate the first metering information based on the first XML schema, and
generate the second metering information based on the second XML schema.

9. The device of claim 1, wherein the utility meter accessory is included in a mobile device.

10. The device of claim 1, wherein the first metering information includes the first portion of the image and the second metering information includes the second portion of the image.

11. A method comprising:
receiving, by a processor and from a utility meter accessory, an image of utility meters associated with one or more utility service providers, wherein the image is received from the utility meter accessory via a data connection;
processing, by the processor, the image of the utility meters to extract, from the image, metering information for the utility meters, wherein processing the image includes:
partitioning the image to identify respective portions of the image associated with the utility meters, wherein the respective portions of the image include a first portion associated with a first of the utility meters and a second portion associated with a second of the utility meters,
processing the first portion and the second portion to determine a first attribute associated with the first utility meter and a second attribute associated with the second utility meter,
determining, based on the first attribute, a first meter type of a plurality of meter types associated with the first utility meter,
determining, based on the second attribute, a second meter type of the plurality of meter types associated with the second utility meter,
selecting, from a plurality of metering information extraction processes and based on the first meter type and a second meter type, a first information extraction process for the first utility meter and a second information extraction process for the second utility meter,
performing the first metering information extraction process on the first portion to extract first metering information for the first utility meter, and
performing the second metering information extraction process on the second portion to extract second metering information for the second utility meter; and
transmitting, by the processor, the first metering information and the second metering information to the one or more utility service providers.

12. The method of claim 11, wherein the data connection comprises a wireless data connection coupling a device associated with the processor and the utility meter accessory.

13. The method of claim 11, wherein processing the image of the utility meters includes:
performing an optical character recognition (OCR) process on the image.

14. The method of claim 11, wherein the first attribute includes one or more of:
a shape of the first utility meter,
a symbol displayed on the first utility meter,
a barcode displayed on the first utility meter,
an alphanumeric code displayed on the first utility meter,
a layout of the first utility meter,
a position of the first utility meter in the image, or
an identifier associated with the utility meter accessory.

15. The method of claim 11, wherein the processor is included in a set top box.

16. The method of claim 11, wherein the data connection comprises an encrypted data connection.

17. The method of claim 11, further comprising:
forwarding, via the data connection, a signal to the utility meter accessory, wherein the utility meter accessory acquires the image based on receiving the signal.

18. The method of claim 11, wherein the one or more utility service providers include a first utility service provider and a second utility service provider, wherein the first meter is associated with the first utility service provider and the second meter is associated with the second utility service provider, and wherein the method further comprises:
determining a first delivery format associated with the first utility service provider and a second delivery format associated with the second utility service provider, wherein the first delivery format includes a first extensible markup language (XML) schema and the second delivery format includes a second XML schema;
generating the first metering information based on the first XML schema; and
generating the second metering information based on the second XML schema.

19. The method of claim 11, wherein the utility meter accessory is included in a mobile device.

20. The method of claim 11, wherein the first metering information includes the first portion of the image and the second metering information includes the second portion of the image.

21. A non-transitory computer readable medium to store instructions, the instructions comprising:
one or more instructions that, when executed by a processor, cause the processor to:
obtain an image of utility meters associated with a plurality of utility service providers,
partition the image to identify respective portions of the image associated with the utility meters, wherein the respective portions of the image include a first portion associated with a first of the utility meters and a second portion associated with a second of the utility meters, process the first portion and the second portion to determine a first attribute associated with the first utility meter and a second attribute associated with the second utility meter, determine, based on the first attribute, a first meter type of a plurality of meter types associated with the first utility meter and a first utility service provider of the plurality of utility service providers associated with the first meter, determine, based on the second attribute, a second meter type of the plurality of meter types associated with the second utility meter and a second utility service provider of the plurality of utility service providers associated with the second meter, wherein the first utility service provider and the second utility service provider are different, select, from a plurality of metering information extraction processes and based on the first meter type and a second meter type, a first information extraction process for the first utility meter and a second information extraction process for the second utility meter, perform the first metering information extraction process on the first portion to extract first metering information for the first utility meter, perform the second metering information extraction process on the second portion to extract second metering information for the second utility meter, and transmit the first metering information to the first utility service provider and the second metering information to the second utility service provider.

22. The non-transitory computer readable medium of claim 21, wherein the first attribute includes one or more of:

a shape of the first utility meter,
a symbol displayed on the first utility meter,
a barcode displayed on the first utility meter,
an alphanumeric code displayed on the first utility meter,
a layout of the first utility meter, or
a position of the first utility meter in the image.

23. The non-transitory computer readable medium of claim 21, wherein the image is received from an image capturing device, and wherein the one or more instructions further cause the processor to:

forward a signal to the image capturing device, wherein the signal causes the image capturing device to acquire the image and forward the image to the processor.

24. The non-transitory computer readable medium of claim 21, wherein the one or more instructions further cause the processor to:

determine a first delivery format associated with the first utility service provider and a second delivery format associated with the second utility service provider, wherein the first delivery format includes a first extensible markup language (XML) schema and the second delivery format includes a second XML schema, generate the first metering information based on the first XML schema, and generate the second metering information based on the second XML schema.

25. The non-transitory computer readable medium of claim 21, wherein the first metering information includes the first portion of the image and the second metering information includes the second portion of the image.

* * * * *